Oct. 9, 1962 H. A. GARSKE 3,057,496
BUCKET LOADER
Filed Nov. 19, 1959
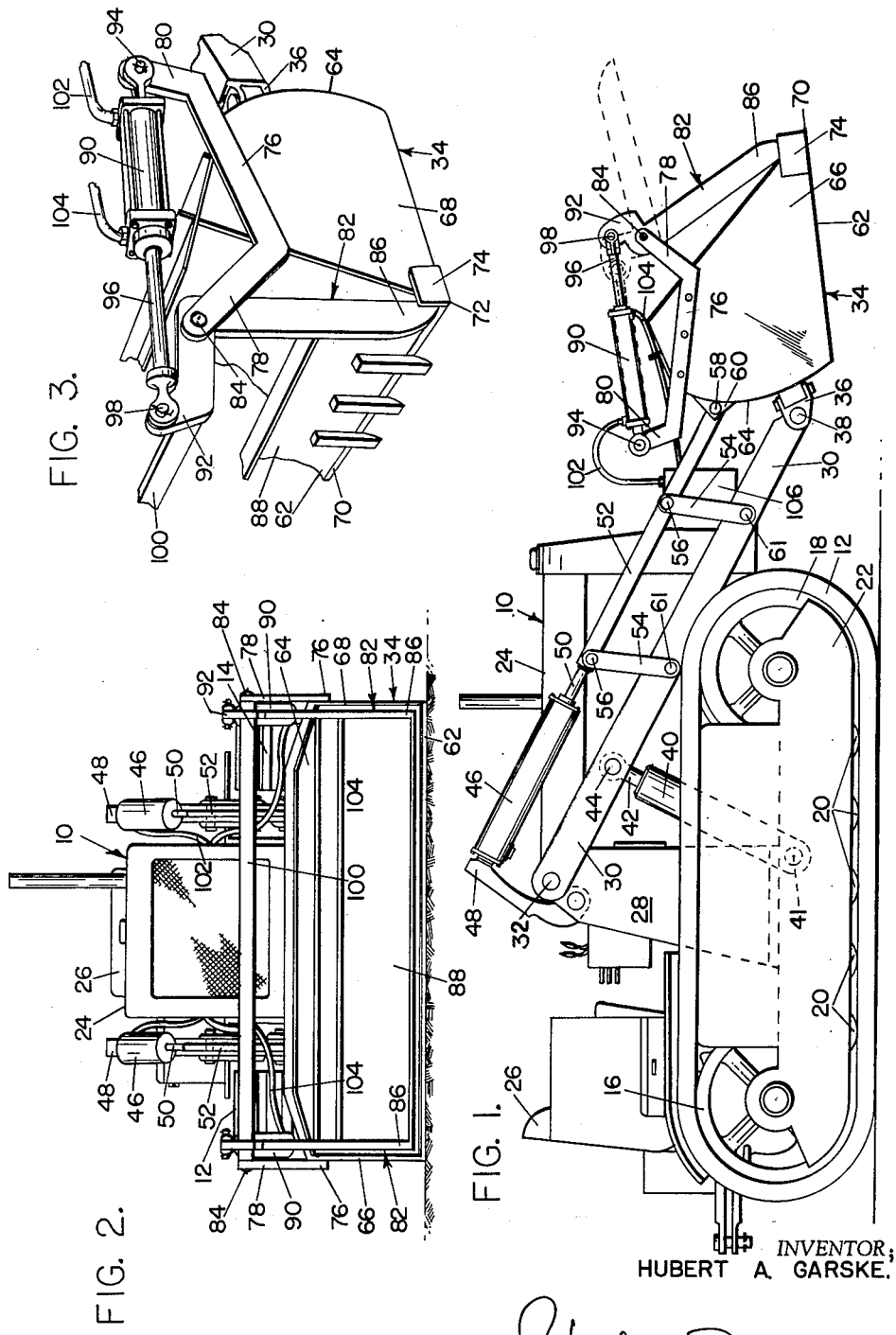
INVENTOR;
HUBERT A. GARSKE.
BY Robert M. Dunning
ATTORNEY United States Patent Office 3,057,496
Patented Oct. 9, 1962

3,057,496
BUCKET LOADER
Hubert A. Garske, 623 Labore Road, St. Paul 9, Minn.
Filed Nov. 19, 1959, Ser. No. 854,053
3 Claims. (Cl. 214—140)

This invention relates to vehicle mounted material handling apparatus and deals particularly with a new and useful attachment which may be mounted on material loading equipment embodying a bucket, shovel, scoop, or the like, and which is mounted on a tractor or other vehicle. Material handling apparatus equipped with my new invention may be employed for land clearing, log handling, earth moving, picking up material, bulldozing and numerous other uses of this general nature.

Vehicles equipped with a shovel or a bucket are somewhat limited in the types of work which they may accomplish. When skid-shoveling (filling the bucket from the front), much of the material loaded will fall from the bucket as the vehicle is reversed or the bucket is raised due to the open front on the bucket.

It is with these thoughts in mind that this invention contemplates an attachment for skid shovels or front loading vehicle mounted buckets which will greatly diversify their uses. For instance, a skid shovel equipped with the new attachment may be utilized as a clam shell, loading and lifting such items as trash, manure, stones and other material. When utilized as a front loading skid shovel the attachment greatly increases the size of the load which may be handled by the bucket. The device is constructed so that it may be used as a bulldozer. Also the blade element of the new attachment may be provided with teeth along its lower material engaging edge and hence be utilized in a scarifying operation.

A feature of the present invention resides in the provision of a loading attachment which may be operated hydraulically using the same hydraulic system as is employed for operating the primary loading apparatus mounted on the vehicle.

Another feature of this invention resides in the provision of a loading attachment which may be readily mounted on the end walls of the bucket of various types of existing loading apparatus.

A further feature of this invention resides in the fact that the attachment may be swung out of operable position when not in use.

The invention further consists in the various features hereinafter set forth and particularly defined by the claims at the conclusion hereof.

In the drawings:

FIGURE 1 is a side elevational view of a tractor showing the new device mounted thereon.

FIGURE 2 is a frontal elevational view of a tractor and the loading apparatus.

FIGURE 3 is a fragmentary perspective view of the new attachment shown mounted on a bucket, certain portions shown broken away.

In the drawings, the numeral 10 designates generally a tractor of common construction known as the crawler type having endless surface engaging treads 12 and 14 running over a driven sprocket 16 and an idler sprocket 18 here shown conventionally at the rear and front of the tractor, and beneath the usual rail rollers 20 which are mounted in the rail track frames 22. The tractor 10 is driven by an engine housed under the housing 24 and drives the sprocket 16 through a suitable transmission (not shown). The tractor is under the control of an operator in the seat 26, said controls not being specifically shown. Hydraulic pumps and hoses connecting the apparatus to said pump are not completely illustrated. It is understood that the tractor may also be of the wheeled type without departing from the invention.

Opposite sides of the tractor rail frames 22 are provided with suitable upright primary supports 28 which extend above the frame of the tractor at substantially the midpoints of the tractor; and adjacent the upper end of each of the supports is pivotally mounted a support arm 30, the two arms being mounted to their supports 28 by axially aligned pivots 32. At the forward ends of the support arms 30 is pivotally mounted the bucket or skid shovel generally indicated by the numeral 34. The back of the bucket is provided with lugs 36 through which transverse axially aligned connecting pivot pins 38 are inserted thereby connecting the bucket to the forward ends of the support arms.

The raising of the support arms and bucket is effected through the use of hydraulic rams 40 which are normally mounted by aligned pivots 41 at mid points on each side of the vehicle, the piston rods 42 being pivotally connected to the support arms 30 by transverse pivot pins 44.

Control of the tilting or angular position of the bucket relative to the support arms is effected through hydraulic rams 46 which are fixed to brackets 48 connected to the ends of the primary supports 28. The piston rods 50 of the cylinders 46 are suitably pivotally connected to the control arms 52 which in turn are pivotally supported on links 54 by pins 56 having axes parallel to the axes of the pins 58 which connect the control arms 52 to the lugs 60. These lugs are welded or otherwise secured to the curved outer rear surface of the bucket. The links 54 are pivotally supported at 61 to the arms 30.

It is understood that the vehicle and its loading and controlling apparatus may vary from the above description. However, the new attachment may be mounted on any front end loader utilizing a bucket or skid shovel such as the bucket 34.

Referring now more particularly to the elements comprising my invention, the bucket 34 is normally provided with a bottom 62 extending rearwardly to curve upward forming a back wall 64. The ends of the bucket are closed by end walls 66 and 68. The leading edge 70 and the corners 72 of the bucket may be strengthened with plates 74 as shown in FIGURES 1 and 3.

Each end of the bucket is provided with a support bracket 76 which is either bolted or welded thereto. The brackets are provided with forward angularly upstanding end portions 78 and rearward angularly upstanding portions 80.

The brackets 76 provide a support for a pair of bell crank levers generally indicated by the numeral 82. These bell crank levers are supported on each side of the bucket parallel with each other and are pivotally connected intermediate their ends to the bracket ends 78 by transversely aligned pins 84. The lower ends 86 of the bell cranks extend downwardly to support a transversely disposed blade 88 which is welded or otherwise secured between the ends 86 of the cranks 82.

The swingable bell cranks and the mounted blade are controlled by a pair of hydraulic rams 90 which are pivotally connected and supported between the rear angular ends 80 of the brackets 76 and the upper ends 92 of the bell crank levers 82.

The rear end of the rams are held to the ends 80 by transversely aligned pins 94. The piston rods 96 are pivotally connected to the ends 92 of the bell cranks by transversely aligned pins 98. A transversely disposed bracing cross bar 100 is welded or otherwise secured between the ends 92 of the bell cranks 82.

The hydraulic lines 102 and 104 are connected to a pump and accumulator 106 which is located in any suitable area of the vehicle.

When the loader is being used conventionally to load such material as earth, manure, and the like the bucket is lowered to engage the ground as best shown in FIGURE 2 while the blade 88 is in the elevated position as shown in broken lines in FIGURE 1. The vehicle is then driven forwardly so as to push the bucket beneath and into the material being loaded. By pivoting the bell cranks 82 the blade is then urged towards the bucket engaging the material. If the material being loaded is loose earth or sand the blade is drawn into the bucket slightly beyond the leading edge 70 of the bucket thereby blocking the open forward end of the bucket. If the material being loaded is in the nature of straw, manure, or the like, a generous amount of this type of material may be held between the bucket and the blade even though the blade is substantially spaced from the opening of the bucket.

The attachment may be utilized to spread loose dirt or the like when the blade is in position across the opening of the bucket. Furthermore a plurality of teeth may be mounted on the lower edge of the blade adapting it for use in a scarifying operation.

The construction and mounting of the new device is such that it will not interfere with the normal operation of the loader. The blade and bell cranks are independently operated and may be swung out of the way when not in use. The new device moves with the bucket at all times unless independently operated.

In accordance with the patent statutes, I have described the principles of construction and operation of my improvement in vehicle mounted material handling apparatus, and while I have endeavored to set forth the best embodiment thereof, I desire to have it understood that changes may be made within the scope of the following claims without departing from the spirit of my invention.

I claim:

1. In a material handling apparatus, the combination with a motor driven vehicle, of a pair of support arms pivotally mounted at one end on aligned pivots on opposite sides of said vehicle having their outer ends projecting beyond the forward end of said vehicle, hydraulic cylinder means connecting said arms and said vehicle for raising said support arms, a bucket carried on the outer ends of said support arms and including bucket end walls and a bucket bottom, power operated means for tilting said bucket relative to said support arms, a pair of support brackets fixedly mounted on the ends of said bucket, said bracket having rearward and forward angularly upstanding end portions, a pair of similar bell crank levers pivotally mounted intermediate their ends on the said forward angularly upstanding ends of said support brackets on aligned pivots, a material engaging blade supported between said bell crank levers at one end thereof, a hydraulic cylinder mounted between the other ends of said bell crank levers and said rearward angularly upstanding portions of said support brackets for swinging said bell crank levers and said blade toward and away from said bracket.

2. A material handling apparatus, in combination with a motor driven vehicle, a pair of parallel supporting arms pivotally connected to opposite sides of the vehicle by aligned pivots, said arms projecting beyond an end of the vehicle, a bucket having spaced end walls and a connecting bottom pivotally connected between the projecting ends of the arms by aligned pivots, a pair of parallel mounting brackets each having its center portion fixed to a corresponding one of said end walls and having upstanding ends, parallel bent crank levers pivotally connected intermediate their ends to opposite ends of said brackets, a material gathering blade between opposed ends of said levers, the lower end of said blade being swingable toward and away from the forward edge of said bucket bottom, the other ends of said levers extending in a direction away from said bucket when said blade is swung toward said bucket bottom, a hydraulic cylinder and piston device hingedly connected at one end to the other end of a corresponding one of said brackets and pivotally connected at the other end to the other end of a corresponding lever, the axis of each device being above the points of pivot between said levers and said bucket, and means pivoting said arms in unison, operation of said hydraulic device swinging said blade toward and away from said bucket bottom.

3. The structure of claim 2 and including a second pair of arms pivotally connected to said bucket above the pivot points of said first named arms thereto, means pivotally connecting said first and second arms to hold them in parallel relation, and means for moving said second arms relative to said first arms to pivot said bucket about the pivotal connections between said bucket and said first arms.

References Cited in the file of this patent

UNITED STATES PATENTS

| | | |
|---|---|---|
| 2,470,779 | Landovski et al. | May 24, 1949 |
| 2,565,384 | Lindquist | Aug. 21, 1951 |
| 2,799,412 | Pilch | July 16, 1957 |
| 2,812,595 | Drott | Nov. 12, 1957 |
| 2,883,772 | Dodge | Apr. 28, 1959 |